(12) United States Patent
Sapija et al.

(10) Patent No.: US 11,739,860 B2
(45) Date of Patent: Aug. 29, 2023

(54) VALVE POSITION INDICATORS

(71) Applicant: Goodrich Corporation, Charlotte, NC (US)

(72) Inventors: Dariusz Sapija, Jelcz-Laskowice (PL); Agata Kurowska, Kowale (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/530,891

(22) Filed: Nov. 19, 2021

(65) Prior Publication Data
US 2022/0154845 A1   May 19, 2022

(30) Foreign Application Priority Data
Nov. 19, 2020   (EP) ..................................... 20461584

(51) Int. Cl.
| | |
|---|---|
| *F16K 31/528* | (2006.01) |
| *F16K 5/16* | (2006.01) |
| *F16K 5/18* | (2006.01) |
| *F16K 31/524* | (2006.01) |
| *F16K 31/54* | (2006.01) |

(Continued)

(52) U.S. Cl.
CPC .......... *F16K 31/5284* (2013.01); *F16K 5/163* (2013.01); *F16K 5/187* (2013.01); *F16K 31/524* (2013.01); *F16K 31/54* (2013.01); *F16K 31/60* (2013.01); *F16K 37/0008* (2013.01); *F16K 37/0041* (2013.01); *F16K 37/0058* (2013.01); *F16K 37/0083* (2013.01)

(58) Field of Classification Search
CPC ...... F16K 31/5284; F16K 5/163; F16K 5/187; F16K 31/524; F16K 31/54; F16K 31/60; F16K 37/0008; F16K 37/0041; F16K 37/0058; F16K 37/0083
USPC .................................................. 137/551–556
See application file for complete search history.

(56) References Cited

U.S. PATENT DOCUMENTS

| | | | | | |
|---|---|---|---|---|---|
| 4,491,775 | A | * | 1/1985 | Harvey | ................. H02P 25/024 318/434 |
| 5,223,822 | A | * | 6/1993 | Stommes | ............ F16K 37/0058 200/336 |

(Continued)

FOREIGN PATENT DOCUMENTS

WO   WO-0206594 A1 *  1/2002  ............. B64D 11/02

OTHER PUBLICATIONS

European Search Report for Application No. 20461584.3, dated May 4, 2021, 8 pages.

*Primary Examiner* — Angelisa L. Hicks
(74) *Attorney, Agent, or Firm* — Cantor Colburn LLP

(57) ABSTRACT

A rotational valve includes a valve closure element, a shaft, at least one detection element, at least one detection engagement means, at least one first stop and at least one second stop. The shaft is linked to the valve closure element and the shaft can rotate between a closed position and a fully open position. Each detection element comprises an aperture and an indicator element, the shaft extends through the aperture of at least one detection element, and each detection element is in sliding engagement with the shaft. The shaft can rotate relative to the detection element, each indicator element can move between a first and a second indicator position, each indicator element abuts a first stop when in the first indicator position and abuts a second stop when in the second indicator position.

14 Claims, 13 Drawing Sheets

(51) Int. Cl.
*F16K 31/60* (2006.01)
*F16K 37/00* (2006.01)

(56) References Cited

U.S. PATENT DOCUMENTS

| | | | |
|---|---|---|---|
| 5,277,223 | A | 1/1994 | Glockner et al. |
| 6,116,215 | A | 9/2000 | Soleanicov et al. |
| 6,308,723 | B1 * | 10/2001 | Louis ..................... G01D 5/16 |
| | | | 137/554 |
| 7,036,791 | B2 | 5/2006 | Wiese |
| 7,934,518 | B2 * | 5/2011 | Rho ..................... F16K 1/221 |
| | | | 137/554 |
| 8,272,281 | B2 | 9/2012 | Mccarty |
| 8,763,637 | B2 | 7/2014 | Soldo et al. |
| 10,140,843 | B2 * | 11/2018 | Jordan ............... A61N 1/36053 |
| 2001/0035510 | A1 | 11/2001 | Oh |
| 2013/0043420 | A1 | 2/2013 | Case et al. |

\* cited by examiner

VALVE POSITION INDICATORS

CROSS-REFERENCE TO RELATED APPLICATIONS

This application claims priority to European Patent Application No. 20461584.3 filed Nov. 19, 2020, the entire contents of which is incorporated herein by reference.

TECHNICAL FIELD

This disclosure relates to valve position indicators and, in particular to valve position indicators for rotational valves.

BACKGROUND

Valves for use in controlling the flow of fluids are known. They frequently include a valve body and a closure element. The valve body includes a passage in which is mounted the closure element. In some known examples The closure element rotates around a rotational axis to move between a closed position in which the closure element blocks the passage and thus prevents flow of the fluid through the passage/valve and a fully open position in which the closure element does not block or only partially blocks the passage and thus permits a maximum rate of fluid flow through the passage/valve. Such valves may be referred to as rotational valves. When the closure element is between the closed position and fully open position the rate of flow of fluid through the passage/valve will depend on the exact position and the configuration of the closure element.

Typically some examples are quarter turn valves, such as a butterfly valves or ball valves and the closure element is a disc or a ball respectively. In such valves a rotation of the closure element through 90 degrees of rotation around a rotational axis will move the closure element between fully closed and fully open positions.

In other examples, the passage in the valve body may comprise a central chamber in which is located a closure element such as a ball shaft. The valve body defines a number of passages (inlets/outlets) extending from the central chamber to mouths in the outside surface of the valve body. The number of passages may be three or more, and the closure element may be configured to perform one or more of the functions of blocking or closing the end of each passageway where it opens into the central chamber, connecting a number of the ends of a number of passageways where they open into the chamber allowing fluid flow between those ends whilst blocking the end of a number of passageways where they open into the central chamber, or connecting the ends of all of the passageways where they open into the central chamber to allow fluid flow between all the passageways. For example, the number of passageways may be three and the closure element may define a "T" shaped passageway or channel within the closure element.

It is generally desirable that the users of rotational valves can determine at least whether the valve is in one or both of its closed or fully open position (assuming it has such positions) and/or how open the valve is and as such the rate of flow of fluid through the valve or through certain passages through the valve. The level of accuracy required in the determination of how open the valve is will depend upon the nature of the use of that valve.

Rotation of the closure element is generally caused by an actuator rotating a shaft which is connected to the closure element. The actuator can be a manually operated handle, an electromechanically powered or pneumatically powered actuator or similar. The shaft that causes rotation of the closure element typically has a first end which is engaged with the closure element and a second end that is directly or indirectly (via one or more known types of linkages, shafts, gears or other mechanical means) engaged with an actuator such as an electrically powered motor.

SUMMARY

According to a first aspect of the present invention there is provided a rotational valve comprising a valve closure element, a shaft, at least one detection element, at least one detection means, at least one first stop and at least one second stop. The shaft is linked to the valve closure element and the shaft can rotate between a first datum position and a second end position. Each detection element comprises an aperture and an indicator element. The shaft extends through the aperture of at least one detection element, the/each detection element is in sliding engagement with the shaft, and the shaft can rotate relative to the/each detection element. Each indicator element can move between a first and a second indicator position, each indicator element abuts a first stop when in the first indicator position and abuts a second stop when in the second indicator position. Each indicator element is associated with a detection means, and each detection means can determine when it's associated indicator element is in one of the first or second indicator positions. Each detection element is configured to engage with the shaft via at least one engagement mechanism when the rotational position of the shaft relative to the shaft's first datum position is in a predetermined angular range.

In an embodiment of any of the above embodiments, the rotational angle between the first datum position and second end position is less than or equal to 360 degrees.

In an embodiment of the above embodiment the rotational valve comprises at least two detection elements, and each of the detection elements engages with the shaft when the rotational position of the shaft relative to the shaft's first datum position is in a predetermined angular range and that angular range is different for each detection element.

In the present disclosure all references to rotation of the shaft, engagement mechanism, and the/each detection element is reference to rotation around the central longitudinal axis of the shaft unless otherwise stated. References to angular positions and angular ranges of the shaft, engagement mechanism, and the/each detection element are references to angular positions and angular ranges around the central axis of the shaft unless stated otherwise. References to radial, circumferential, and longitudinal or axial are relative to the central axis of the shaft.

In an embodiment of any of the above embodiments the shaft and the closure element may be directly linked to each other and the rotational angle between the shaft datum position and end position for the closure means will be the same as for the shaft. In an alternative embodiment of any of the above embodiments the shaft and the closure element may be indirectly linked to each other and the rotational angle between the shaft datum position and end position for the closure means may be different to that for the shaft. This may be caused by the linkage between the shaft and the closure element including a number of gears or other rotation magnifiers or reducers which will lead to a certain amount of rotation of the shaft causing a different amount of rotation of the closure element.

In an embodiment of any of the above embodiments, the aperture of each of the detection elements extends through the detection element and the aperture is defined by a face of the detection element.

In an embodiment of any of the above embodiments, the detection element substantially has the form of a three dimensional (3D) annulus.

In an embodiment of any of the above embodiments, one or both of the shaft and the aperture of each detection element have a substantially cylindrical radially outer or radially inwardly facing face respectively.

In an embodiment of any of the above embodiments, the shaft may comprise a number of radially outer faces or a radially outer surface configuration such that when the shaft extends through the aperture of the/each detection element there are sufficient points of contact with the face that defines each aperture that the shaft and aperture remain in sliding contact with each other during a full (360 degree) rotation of the shaft relative to the detection element, and the shaft and the aperture are co-axial.

In an embodiment of any of the above embodiments, the face that defines the aperture of each detection element may comprise a number of faces or a surface configuration such that when the shaft extends through the aperture of the detection element there are sufficient points of contact with the radially outer face of the shaft that the shaft and aperture remain in sliding contact with each other during a full rotation of the shaft relative to the detection element, and the shaft and the aperture are co-axial.

The/each detection element comprises an indicator element which is adapted to be detected by the detection means. The indicator element is, in an embodiment of any of the above embodiments, an arm or other element upstanding from a surface of the detection element. The arm may be parallel sided in the circumferential direction or may have sides in the circumferential direction that are not parallel. The surface from which the indicator element upstands may be a radially outer surface of the detection element. Alternatively, it may be a surface which wholly or at least partially faces in a non-radial direction.

In an embodiment of any of the above embodiments, the indicator element and the first and second stops with which the indicator element is associated are so located and configured that rotation of the detection element about the central axis is prevented when, by virtue of that rotation, the indicator element is brought into abutting contact with either of the stops (the first or second indicator positions). This has the effect that the maximum rotation that each detection element may make is the rotational angle between the portions of the first and second stops against which the indicator element may abut.

The indicator element may, in addition to abutting a first or second stop also, for at least a portion of its travel between the first and second indicator positions, contact a part of a detection means. For example when the detection means is a mechanical switch the indicator element closes the switch when it moves into one of the first and second indicator positions but the indicator element may be in contact with part of the switch as it approaches one of the first and second indicator positions.

The indicator element may be adapted to be detected by a detection means that is an on/off detection means. Alternatively, the indicator element may be adapted to be detected by a detection means that may detect the position of the indicator element over a range of positions. For example the detection means may detect the proximity of the indicator means to the first or second indicator positions.

Each detection element and the portion of shaft that is in sliding contact with the detection element further comprises a part of at least one engagement mechanism. In some embodiments, two engagement mechanisms.

The valve of the first aspect of the present disclosure is so configured that the movement of the/each indicator element into and out of the first or second indicator positions is an indication of the valve closure element moving into or out of a particular known position. That position may be when the valve is closed or fully open or other positions. When the valve of the present disclosure comprises two or more detection elements, the indicator elements of each detection element will move into or out of the first or second indicator position at different times as the closure element is moved by virtue of the rotation of the shaft.

The rotational position of the shaft, position of the indicator element on a detection element, and the location of the engagement mechanism on the shaft and that detection element determines the position of the closure element when the indicator element of the detection element moves into or out of the first or second indicator position.

In an embodiment of any of the above embodiments, the engagement mechanism comprises a shaft engagement means and a detection engagement means associated with the shaft and detection element respectively.

In an embodiment of any of the above embodiments, the shaft engagement means of each engagement mechanism are located at the same rotational position on the shaft and axially spaced thereon, and the detection engagement means on a detection element is located at a different position relative to the indicator element than on each other detection element. Alternative expressed, if the indicator element for each detection element is considered to be at the rotational position of 0 (zero) degrees the detection engagement means for each of the detection elements is at a different rotational angle from the indicator element than the other detection means.

In an alternative embodiment of any of the above embodiments, the shaft engagement means of each engagement mechanism is located at a different rotational position on the shaft and axially spaced thereon, and the detection engagement means is located at the same position relative to the indicator element on each detection element. Alternatively expressed, if the indicator element for each detection element is considered to be at the rotational position of 0 (zero) degrees each detection engagement means is at the same rotational angle from the indicator element.

In an embodiment of any of the above embodiments, engagement of the shaft and detection engagement means of an engagement mechanism allows the shaft to transmit rotational torque from the shaft to the detection element via those engagement means. The shaft and detection engagement means are so configured that if rotation of the detection element is resisted by a force greater than a disengagement force the shaft and detection engagement means will disengage from each other. This arrangement is beneficial because the disengagement force can be set so that it is greater than any frictional forces the detection element may normally be exposed to, and lower than a force that will cause damage to any part of the valve. As a result, once the indication element of a detection element travelling in a first direction reaches its first or second indicator position and abuts the first or second stop, the stop will prevent further rotation of the detection element in the first direction. As a result the force resisting the rotation of the detection element will rapidly increase. That increase will equally rapidly exceed the disengagement force and the shaft and detection engagement means of the detection element will disengage. The shaft can thus continue to rotate in the first direction without causing damage to the valve.

In an embodiment of any of the above embodiments the shaft engagement means of at least one engagement mechanism is a male engagement means and the detection engagement means of that engagement mechanism is a female engagement means. In an alternative embodiment the shaft engagement means of at least one engagement mechanism is a female engagement means and the detection engagement means of that engagement mechanism is a male engagement means.

In an embodiment of any of the above embodiments, the male engaging means is a spring ball plunger which is also known as a ball spring plunger (spring ball plungers are widely available) and comprise a cavity, a biasing element, and an upstanding element. The cavity is defined by a cavity base and one or more walls, and the cavity, biasing element and upstanding element are so dimensioned and configured that the cavity may contain the biasing element and the upstanding element. The biasing element biases the upstanding element at least partially out of the cavity, and the upstanding element may reversibly move between a position in which it is at least substantially wholly within the cavity, and a position in which at least a portion of the upstanding element extends out of the cavity. In this embodiment, the male engaging means is configured to engage with the female engaging means when the upstanding element is extending out of the cavity and the upstanding element is radially aligned with the female engaging means. When the upstanding engaging element is not radially aligned with the female engaging means, the upstanding engaging element is biased against the face that includes the female engaging means and slides across that face as the shaft rotates relative to the detection element.

In an embodiment of any of the above embodiments, the female engaging means of at least one engagement mechanism comprises a circumferentially extending slot, in which the axial width and radial depth of the slot are sufficient to allow at least a portion of a male engagement means to enter the slot at one end and move along the circumferential length of the slot to the other end.

In an embodiment of any of the above embodiments, the circumferentially extending slot may have no sides and extend in an axial direction between the axially facing faces of the detection means.

In an alternative embodiment of any of the above embodiments, the slot may be defined by a pair of axially spaced slot walls which extend circumferentially and radially, and a slot base which extends circumferentially between first and second ends and axially between the slot walls.

In an alternative embodiment, the slot may be of approximately the same circumferential dimension as the upstanding element of the male engagement means.

In an embodiment of any of the above embodiments, the male engagement means and one of the first and second ends of the slot are so configured that when the male engagement means abuts that end of the slot, and rotation of the detection element is resisted by a force less than the disengagement force, torque from the shaft is transmitted to the detection element through the abutment of the male engagement means and that end of the circumferentially extending slot. Such an end may be termed an engagement end.

In an embodiment of any of the above embodiments, both ends of the slot are engagement ends.

In an embodiment of any of the above embodiments, the engagement end comprises a slot end wall that extends axially between the axially facing faces of the detection element or the slot walls and at an angle to the radial direction, and the angle to the radial direction is such that when rotation of the detection element is resisted by a force equal to or greater than the disengagement force, the force that is exerted on the upstanding engagement means by the end wall exceeds the force biasing the upstanding engagement means out of the cavity of the male engagement means. As a result, the force exerted by the end wall pushes the upstanding engagement means into a configuration in which it does not extend into the slot. When the force resisting the rotation of the detection element is less than the disengagement force, the force exerted by the end wall and the upstanding engagement means is less than the force biasing the upstanding engagement means out of the cavity of the male engagement means.

In an embodiment of any of the above embodiments, one end of the circumferentially extending slot is so configured that travel of the male engagement member along the slot toward that end and subsequently out of the slot does not transmit any torque from the shaft to the detection element when the rotation of the detection element is resisted by a force less than, equal to or greater than the disengagement force. An embodiment of such a slot has the slot base intercepting the surface into which the slot extends at an acute angle of less than 30 degrees, less than 20 degrees, less than 15 degrees, or less than 10 degrees.

In an embodiment of any of the above embodiments at least one detection means comprises a mechanical switch, a micro switch, an optical sensor, a hall effect sensor, or an ultrasonic sensor, and the indicator element is adapted to interact with the detection means.

In an embodiment of any of the above embodiments, one or both of the first stop and second stop are axially extending and common to each of the indicator elements.

In an embodiment of any of the above embodiments where there are a plurality of detection elements, the shaft further comprises a number of spacers which are configured and distributed so as to maintain a desired axial spacing between the detection elements.

In an embodiment of any of the above embodiments the valve further comprises an actuation means, and operation of the actuation means rotates the shaft and as a result the closure element, or, alternatively, operation of the actuation means moves the closure element and as a result rotates the shaft. The rotation of the shaft or movement of the closure element by the actuation means may be a result of a direct or indirect linkage between the actuation means and the shaft or closure element.

The actuator can be a manually operated handle, an electromechanically powered or pneumatically powered actuator or similar. In an embodiment of any of the above embodiments, the actuation means is an electrically powered motor.

In an embodiment of any of the above embodiments, the valve further comprises an enclosure, in which the enclosure at least partially surrounds the shaft, detection elements, indicator elements and detection means. The enclosure is a case that surrounds the parts of the valve that indicate the position of the closure element and protects them from damage or the ingress of materials than might impede the functioning of the indicator means of the valve.

According to a second aspect of the present disclosure there is provided a system for the supply of water comprising one or more rotational valves according to the first aspect of the present disclosure. The system may be for the supply of potable water. The system may be for the supply of potable water in an aircraft.

According to a third aspect of the present disclosure there is provided a method for determining the position of a valve closure means within a rotational valve comprising use of a valve according to the first aspect of the present disclosure, and an interpretation means for converting the signals received from the/each detection means. In an embodiment of any of the above embodiments, the interpretation means comprises one or more logic circuits. In an embodiment of any of the above embodiments, the interpretation means comprises a processor unit, a memory, and an output means in which the processor unit receives one or more signals from the/each detection means, the processor unit compares the/each received signal with a table stored in the memory, and the processor unit sends one or more signals to the output device dependent upon that comparison.

BRIEF DESCRIPTION OF THE DRAWINGS

The present disclosure will be further described and explained by way of example and with reference to the accompanying drawings in which:

FIGS. 7A-7D show details of a second embodiment of a shaft engagement means of the present disclosure;

DETAILED DESCRIPTION

Figure 1:
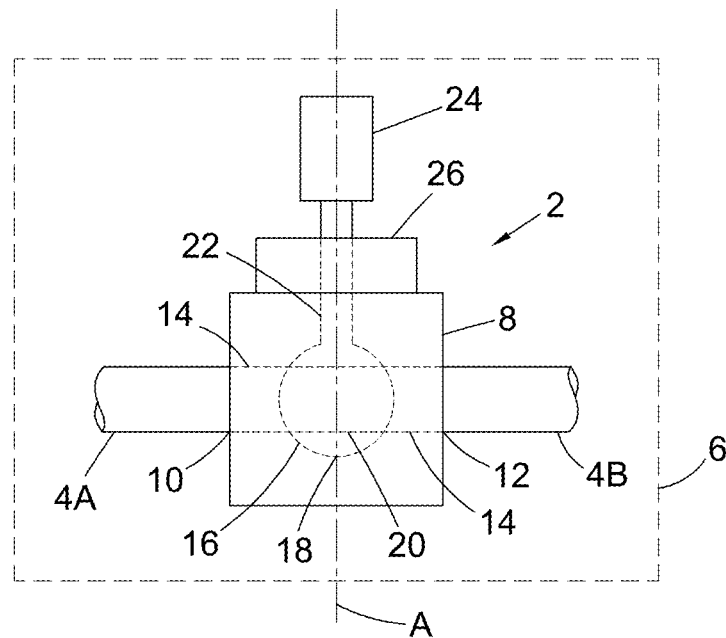
FIG. 1 shows schematic view of a first embodiment of a rotational valve according to the present disclosure in a potable water supply system.

With reference to FIG. 1, a rotational valve 2 is in fluid communication with a conduit 4A through which flows potable water to the valve 2, and conduit 4B through which flows water away from the valve 2. The valve 2 and conduit 4 are part of a potable water supply system 6 of an aeroplane (not shown).

The valve 2 is a shut off valve has a valve body 8 to which the conduits 4A, 4B are attached via inlet and outlet ports 10, 12. Within the valve body 8 is a passage 14 extending between and in fluid communication with inlet and outlet ports 10, 12. Approximately midway along the passage 14 is a valve chamber 16. Within the valve chamber 16 is a closure element 18 which has the form a substantially complete sphere with a passage 20 passing through the sphere 18. The closure element 18 is in sliding and sealing contact with the wall defining the valve chamber 16 and may rotate about axis A. The closure element 18 may rotate between a position in which the passage 20 is in complete alignment and co axial with the passage 14, to be referred to as the valve fully open position, and a position in which the passage 20 is wholly out of alignment with the passage 20 and there is no fluid communication between the passages 14 and 20, to be referred to as the valve closed position.

Figure 15A:
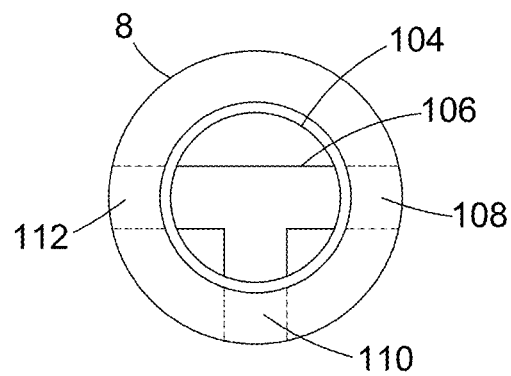
FIGS. 15A-15C shows schematically the ball shaft and valve body of a configurable channel flow valve.
Figure 15B:
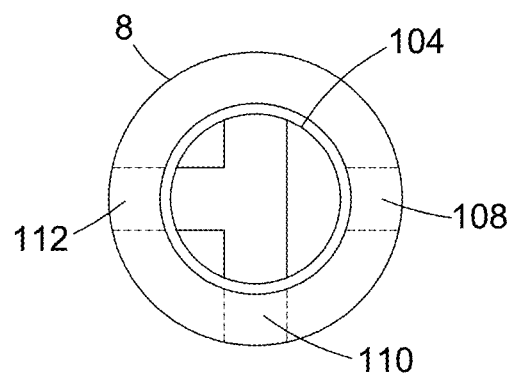
Figure 15C:
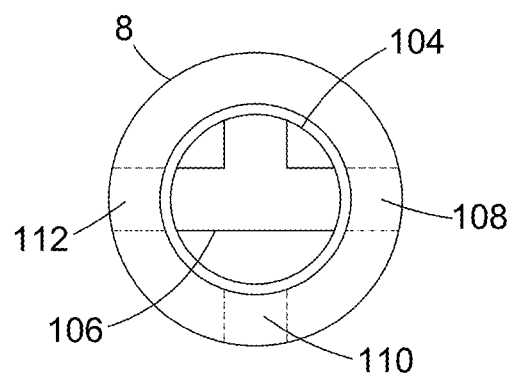

In a second non-illustrated embodiment of the present invention the valve is a configurable channel flow valve and has a valve body to which three conduits are attached via an inlet and two outlet ports. Within the valve body is a bifurcated passage extending between and in fluid communication with the inlet and two outlet ports. Approximately midway along the passage is a valve chamber. Within the valve chamber is a closure element which has the form a substantially complete sphere with a suitably shaped channel passing through the sphere. In some embodiments the channel is T-shaped as schematically illustrated in FIGS. 15A to 15C but alternative shapes of channel can be used and fall within the scope of the present disclosure. The closure element is in sliding and sealing contact with the wall defining the valve chamber and may rotate about axis A. The closure element may rotate between positions in which the channel is in fluid communication with the passage leading to the inlet and the passages to both outlets, to positions in which the channel is in fluid communication with the inlet passage and one of the outlet passages, and the position where the channel is not in fluid communication with any of the inlet or outlet passages. The remainder of the valve is structured in the same fashion and functions in the same way as valve 2 and as described below unless otherwise stated.

A shaft 22 is fixed to the closure element 18 at a location and with an orientation such that the central axis of shaft 18 is coincides with the axis A. The shaft 22 extends between the closure element 18 and an electrically powered motor 24. The motor 24 is so configured that it can rotate the shaft and closure element in either direction around the central axis A and can do so for small steps or small rotational angles around the axis A.

In some, unillustrated, embodiments of the present disclosure the there is a rotation reducing means such as gearing between the motor 24 and the shaft 22 so that rotation of the motor 24 by a certain angle of rotation, for example 40 degrees causes 10 degrees of rotation of the shaft 22.

An enclosure 26 surrounds a part of the shaft 22 and the locator detector means of the valve 2. The enclosure protects the location detector means 28.

With reference to FIGS. 2, 3 and 4A to 4D, a part of the valve 2 is shown. The valve 2 includes three detection elements 30. Each detection element 30 is substantially the shape of a 3D annulus. Extending from the radially outer face of each of the detection elements 30 is an indicator element 32.

The enclosure 26 is attached to the valve body 8 by means not shown, Such means may be known fixing means such as bolts extending into a threaded bore in the valve body 8. The enclosure 26 defines a first void 34 which is configured to surround a portion of the detection elements 30. The first void 34 is so dimensioned that the radially outer face of the detection elements 32 is in close proximity to or in sliding engagement with the face 36 of the enclosure defining the void 34.

The enclosure 26 also defines a second void 38. Second void 38 is configured to both allow movement of indicator element 32 when rotating around axis A, and to house a number of detector means 44. The second void 38 is in part defined by a stop face 40 and a mounting face 42.

The mounting face 42 of the enclosure 26 is adapted to have three detector means 44 attached to that face by known means (not shown). In one example, the attachment means is an adhesive.

Figure 2:
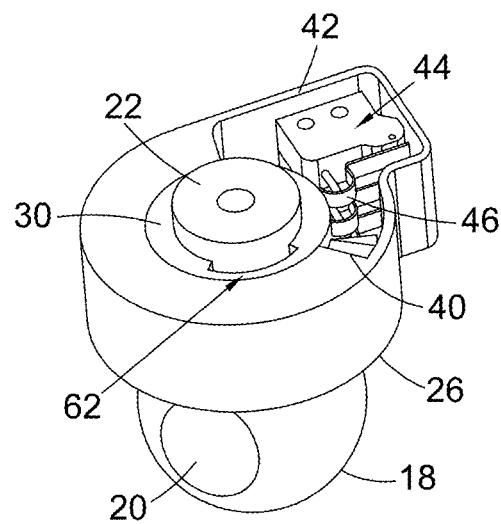
FIG. 2 shows a part of the rotational valve of FIG. 1 with a cut away portion including a number of micro switches as the detection means.
Figure 3:
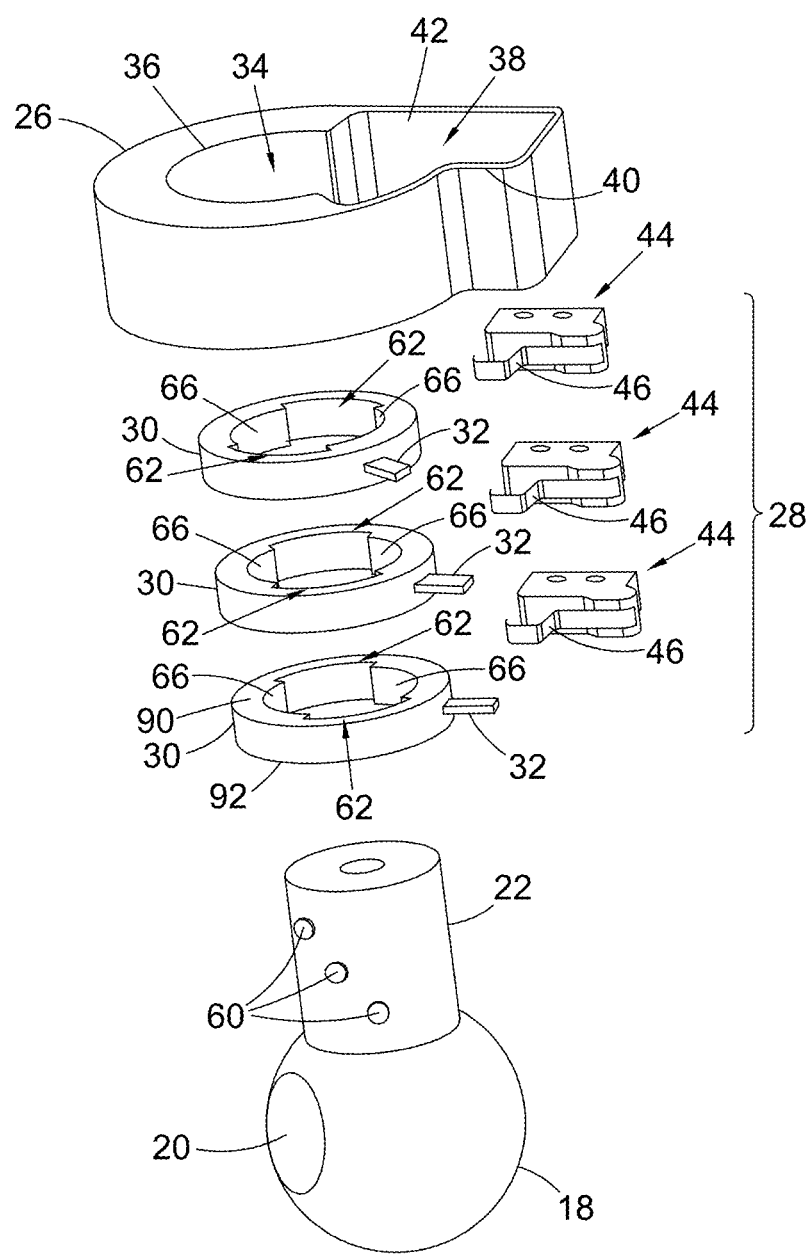
FIG. 3 shows an exploded view of FIG. 2.

In the example shown in FIGS. 2 and 3 each detector means 44 is a simulated roller lever micro switch. In the examples shown in FIGS. 4A to 4D each detector means 44 is a roller lever micro switch. The simulated roller lever micro switches/roller lever micro switches are of known construction and include a roller or equivalent 46 fixed at the end of a lever arm 48 which is mounted onto a switch body 50. Impelling the roller or equivalent 46 and hence lever arm 48 towards the switch body 50 causes the roller equivalent or lever arm 48 to push switch 52 changing the micro switch from an open state (no current can flow through the micro switch) to a closed state (current can flow through the micro switch). The lever arm is so constructed that impelling the lever arm 48 toward the switch body 50 elastically deforms the lever arm 48. When the impelling force ceases the lever arm 48 and roller 46 or equivalent move away from the switch body 50 to a position in which the lever arm 48 is not deformed. For clarity the elements of the detector means 44 are labelled in FIG. 4C only.

Figure 4A:
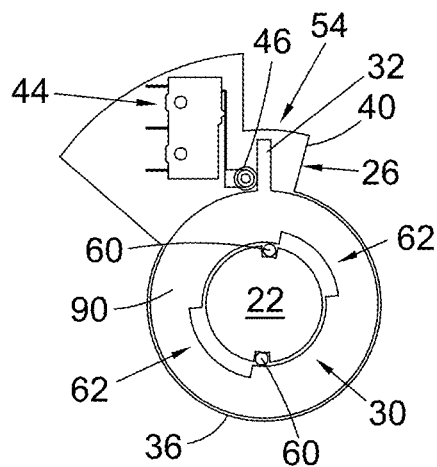
FIGS. 4A-4D show a detail of the valve of FIG. 2.
Figure 4B:
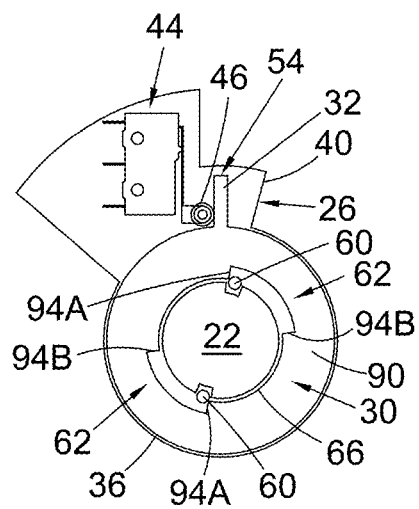

As shown in FIGS. 4A and 4B, the roller 46 or equivalent of the micro switch 44 acts as a first stop 54 preventing the indicator element 32 and hence detection element 30 from rotating anticlockwise as shown in those Figures. In this position the indicator element 32 is in a first indicator position 55. By virtue of the switch 52 being depressed when the indicator element is in the first indicator position 55 the detection means 44 can detect when the indicator means is in the first indicator position.

Figure 4C:
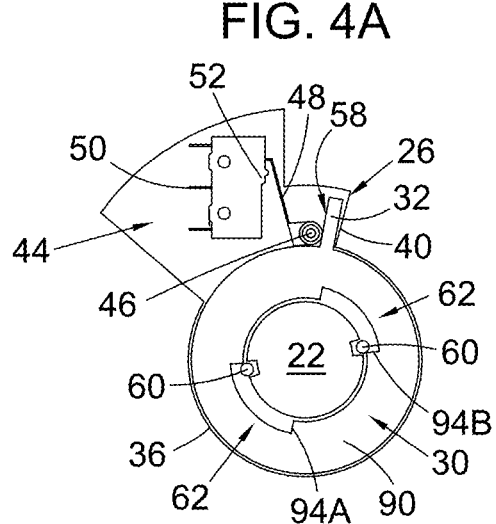
Figure 4D:
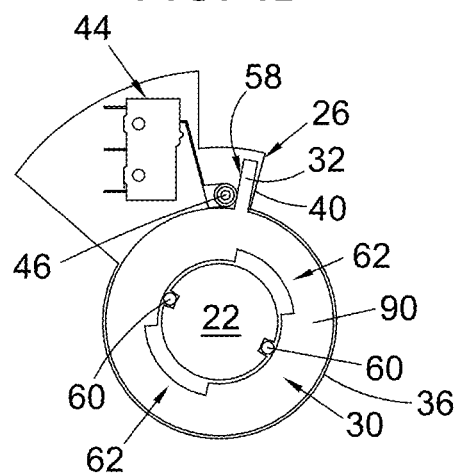

The indicator element 32 may rotate clockwise from the first indicator position 55 (as seen in FIGS. 4A and 4B) until the indicator element abuts the face 40 of the enclosure 26. The face 40 prevents any further clockwise rotation and acts as the second stop. When the indicator element is abutting the face 40 it is in the second indicator position 58 (as shown in FIGS. 4C and 4D).

Each detection element 30 includes an aperture 64 substantially defined by an aperture face 66. The aperture face 66 is configured and dimensioned to overlie a portion of the radially outer face of the shaft 22 and to allow the shaft to rotate about the axis A relative to the detection element 30 with the surface of the shaft in sliding contact with the aperture face. The detection elements 30 may be impelled to rotate around the axis A by the transmission of torque from the shaft 22 to the detection element 30 via one or more engagement mechanisms.

Figure 5A:
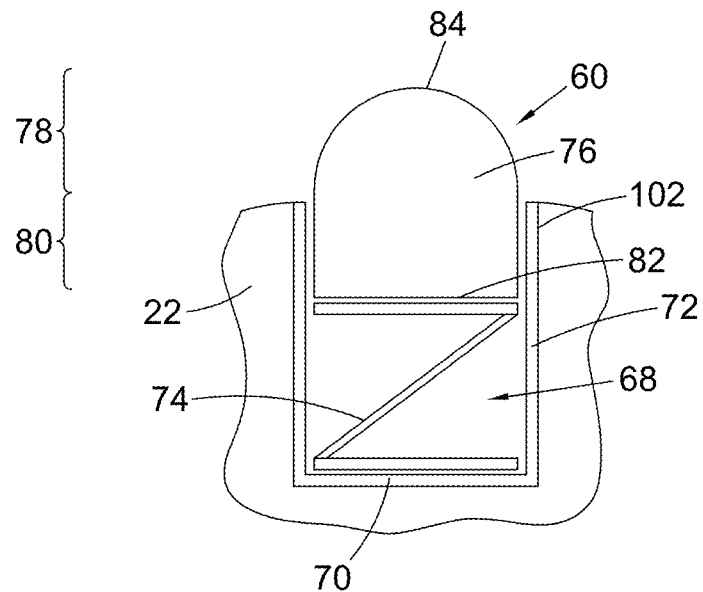
FIGS. 5A and 5B show details of an embodiment of a shaft engagement means of the present disclosure.
Figure 5B:
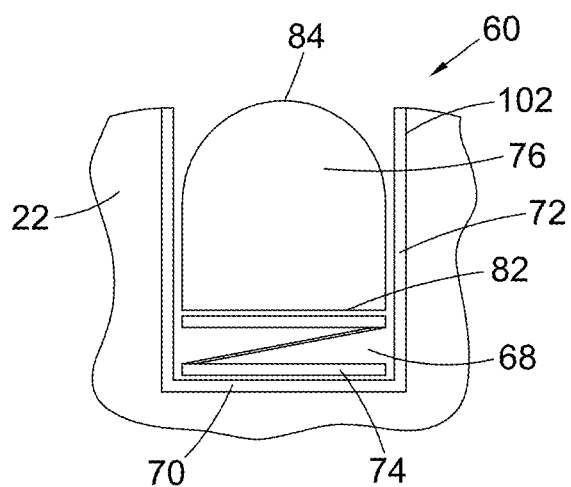

Each engagement mechanism is made up of a shaft engagement means 60 and a detection engagement means 62. With reference to FIGS. 5A and 5B, each shaft engagement means 60 is a spring plunger. The spring plunger is essentially comprised of a shell 102 defining cavity 68 extending radially inward from the radially outer face of the shaft 22. The shell 102 defines a cavity base 70 and a wall 70. The wall 70 is substantially cylindrical and extends from the cavity base to the radially outer surface of the shaft 22.

Within the cavity 68 is a biasing element 74 and an upstanding element 76. The biasing element 74 biases the upstanding element 76 so that the radially outer part of the upstanding element extends out of the cavity 68 as is shown in FIG. 5A.

The upstanding element 76 has a substantially hemispherical radially outer end 70 and a radially inner end 80 that is substantially cylindrical (labelled only in FIG. 5A for clarity). The diameter of the radially inner end 80 of the upstanding element is a little less than the diameter of the wall 72, such that the radially inner end 80 is in loose sliding fit with the wall 72.

The biasing element 74 is located between the cavity base 70 and the radially inner end 82 of upstanding element 76. The biasing element 74 is a helical spring. The helical spring is so dimensioned that in its relaxed, non-deformed, condition the radially outer end 78 of the upstanding element 76 projects above the surface of the shaft 22 as shown in FIG. 5A. This may be termed the first position of the biasing element 74. If a radially inward force exceeding the spring force of the biasing element 74 is applied to the upstanding element 76 it will be pushed into the cavity until the radially outer end 84 of the upstanding element 76 is approximately level with the radially outer surface of the shaft 22. This may be termed the upstanding element's second position and is shown in FIG. 5B. The movement of the upstanding element 76 into it's second position compresses the biasing element 74. When the radially inward force is removed, the biasing element returns the upstanding element to it's first position. The cavity 68 is deep enough to allow the compressed biasing element 74 and the upstanding element 76.

The shaft engagement means may include elements (not shown) that prevent the upstanding element 76 fully leaving the cavity 68.

The shell 102 of the spring plunger 60 has an external thread allowing it to be screwed into threaded bores (not shown) in the shaft 22.

Figure 6A:
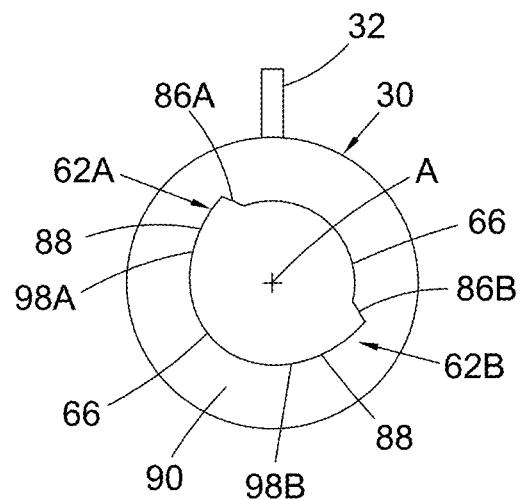
FIGS. 6A-6B show details of a first and second embodiment of a detection engagement means according to the present disclosure.

With reference to FIG. 6A, which shows a first embodiment of the detection element 30, each detection element 30 includes first and second detection engagement means 62A, 62B. Each detection engagement means 62A, 62B is a circumferential slot defined by an end face 86A/86B and a slot base 88. Each slot extends axially from a first axial face 90 to the other axial face 92 of the detection element 30 and intersects those faces.

Each slot base 88 intersects the end face 86A/86B associated with that slot base at an included angle that is at least 90 degrees and preferably greater than 90 degrees and less than 150 degrees. The slot base 88 is curved along its length and the end of the slot base 88 remote from the end face 86A/86B intersects the radially inner face 66 of the detection element at position 98A/98B at an angle of less than 15 degrees to the tangent to the face 66 at position 98A/98B.

The first and second detection element means are so configured that the end faces 86A and 86B are separated by an uninterrupted portion of radially inner face 66. Alternatively expressed, for one of the detection engagement means 62 movement from position 98A to the end face 86A is clockwise movement and movement from position 98B to 86B is anti-clockwise. Clockwise and anti-clockwise are relative to axis A and as shown in FIG. 6A. In other embodiments the movement from position 98A to end from 86A is anticlockwise and from position 98B to 86B is clockwise.

Figure 6B:
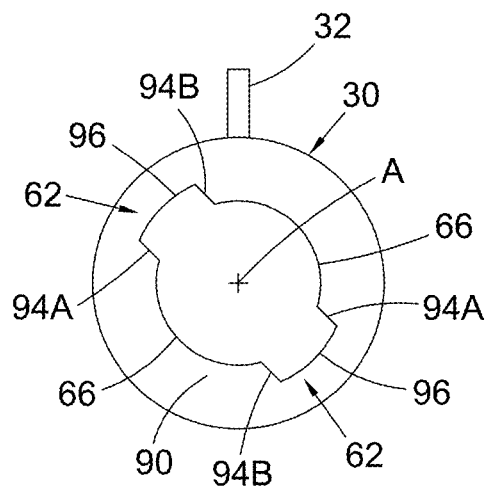

With reference to FIG. 6B, which shows a second embodiment of the detection element 30, each detection element 30 includes first and second detection engagement means 62. Each detection engagement means is a circumferential slot defined by a pair of end faces 94A, 94B and a slot base 96. Each slot extends axially from a first axial face 90 to the other axial face 92 of the detection element 30 and intersects those faces.

Each slot base 96 intersects the end faces 94A, 94B associated with that slot base at an included angle that is at least 90 degrees and preferably greater than 90 degrees and less than 150 degrees. The slot base 96 is curved along its length and describes an arc around the axis A.

With further reference to FIGS. 4A to 4D, the spring plunger/shaft engagement means 60 and detection engagement means 62 as shown in FIG. 6B functions in the following fashion.

The shaft is provided with a pair of spring plunger/shaft engagement means 60 for each detection element. The shaft engagement means 60 are located diametrically opposite to each other on the shaft. The pairs of shaft engagement means 60 are axially spaced along the shaft 22, FIGS. 4A to 4D show only one of the detection elements on the shaft 22.

FIG. 4A shows the indicator element 32 in its first indicator position 55 causing the switch 52 to be depressed and in its closed state. The rotational angle of the shaft 22 is such that neither shaft engagement means 60 is radially aligned with a detection engagement means 62. As a result, the upstanding element 76 is in it's second position within the cavity 68 and the radially outer end 84 of upstanding element 76 is biased against the radially inner face 66 of the detection element 30.

Rotation of the shaft 22 in a clockwise direction to the position shown in FIG. 4B causes the shaft engagement means 60 to come into radial alignment with the detection engagement means 62. The upstanding element 76 is biased into its first upstanding position by biasing means 74.

Continued clockwise rotation of the shaft 22 causes the upstanding elements 74 to travel along the slots of the detection engagement means 62 until upstanding elements 76 abut end faces 94B. When the detection element 30 is orientated as shown in FIG. 4B there is little resistance to detection element 30 rotating in a clockwise direction. What resistance to rotation there is arises from friction between the radially outer face of the detection element 30 and the void defining face 36 of the enclosure 26. That disengagement force is calibrated so that the forces arriving from that resistance to rotation are smaller than the disengagement force. As a result, torque is transmitted from the shaft 22 through the upstanding element 76 and into the detection element 30 via the end face 94B. This causes the detection element 30 to rotates until the indicator element 32 reaches the second indicator position 58 and abuts the stop face 40 (as shown in FIG. 4C).

When the indicator element 32 reaches the second indicator position 58 the resistance to clockwise rotation of the detection element 30 very rapidly increases. The resistance to rotation very rapidly reaches the disengagement force and the radial vector of the force transmitted from the end face 94B to the upstanding element 74 exceeds the spring force of the biasing element 74. At that time the upstanding element 74 is pushed into the cavity 68 and the shaft 22 can then continue to rotate in a clockwise direction as shown in FIG. 4D.

When the shaft 22 rotates in an anti-clockwise direction, the same series of events takes place with the exception that the upstanding element 74 abuts end face 94A rather than 94B.

With further reference to FIGS. 7A to 7D, the shaft engagement means 60A, 60B and detection engagement means 62A, 62B as shown in FIG. 6A functions in the following fashion.

The shaft is provided with a pair of spring plungers/shaft engagement means 60A, 60B for each detection element. The shaft engagement means 60A, 60B are located diametrically opposite to each other on the shaft. The pairs of shaft engagement means 60A, 60B are axially spaced along the shaft 22, FIGS. 7A to 7D show only one of the detection elements on the shaft 22.

FIG. 7A shows the indicator element 32 in its first indicator position 55 causing the switch 52 to be depressed and in its closed state. The rotational angle of the shaft 22 is such that neither shaft engagement means 60A/60B is radially aligned with a detection engagement means 62A/62B. As a result, the upstanding element 74 for each of shaft engagement means 60A/60B is in it's second position within the cavity 68 and the radially outer end 84 of upstanding element 76 is biased against the radially inner face 66 of the detection element 30.

Figure 7B:
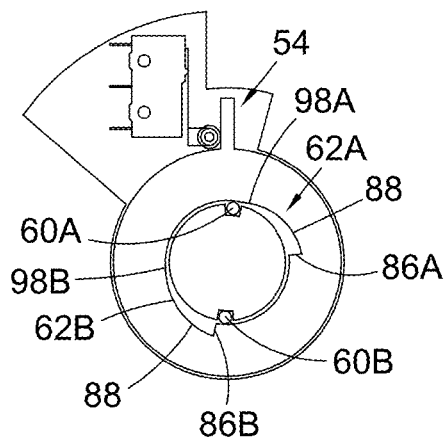
Figure 7B:
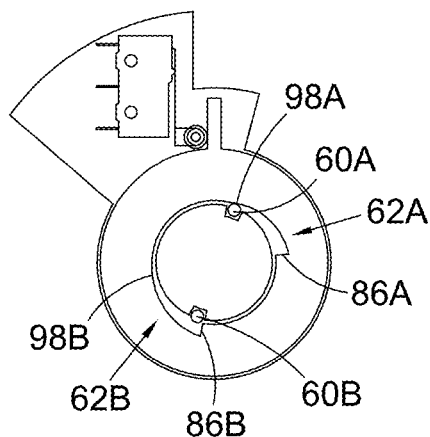

Rotation of the shaft 22 in a clockwise direction to the position shown in FIG. 7B causes the shaft engagement means 60A/60B to come into radial alignment with the detection engagement means 62A/62B. For detection engagement means 62A, the shaft engagement means 60A comes into alignment with the shallowest part of the slot of detection engagement means 62A at position 98A and thus the upstanding element 76 starts to be biased out of the cavity 68. For detection engagement means 62B, the shaft engagement means 60B comes into alignment with the deepest part of the slot of detection engagement means 62B and thus the upstanding element 76 is biased into its first upstanding position by biasing means 74.

Continued clockwise rotation of the shaft 22 causes the upstanding element 74 of shaft engagement means 60A to travel along the slot of the detection engagement means 62A with the upstanding elements 74 moving toward its first position as the slot of detection engagement means 62A deepens. When the upstanding element 74 abuts end 86A it is in its first position. At the same time, the upstanding element 76 of shaft engagement means 60B travels along the slot of the detection engagement means 62B. That motion causes the upstanding element 76 of shaft engagement means 60B to be forced toward it's second position and biasing element 74 to be compressed as the slot of detection engagement means 62B becomes shallower.

Figure 7C:
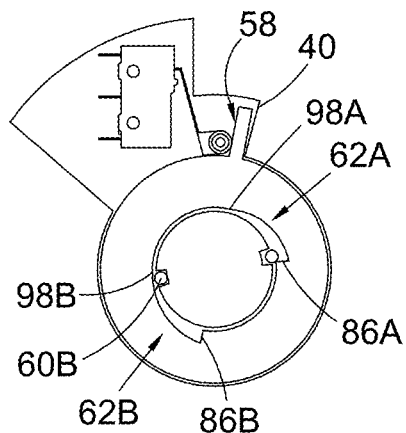

When the detection element 30 is orientated as shown in FIG. 7B there is little resistance to detection element 30 rotating in a clockwise direction and what resistance there is arises from friction between the radially outer face of the detection element 30 and the void defining face 36 of the enclosure 26. As discussed in connection with FIGS. 4A to 4D the force drive to the resistance to rotation causes a force is smaller than the disengagement force. As a result, torque is transmitted from the shaft 22 through the upstanding element 76 of shaft engagement means 60A and into the detection element 30 via the end face 86A. This causes the detection element 30 to rotate until the indicator element 32 reaches the second indicator position 58 and abuts the stop face 40 (as shown in FIG. 7C).

Figure 7D:
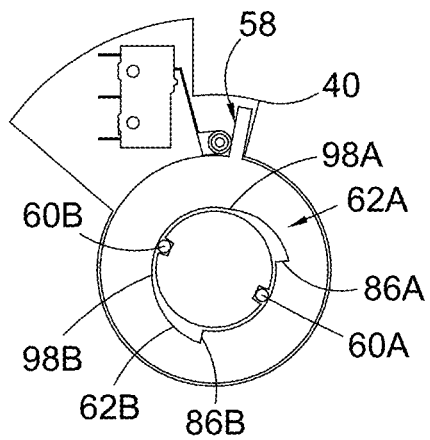

When the indicator element 32 reaches the second indicator position 58 the resistance to clockwise rotation of the detection element 30 very rapidly increases. The resistance to rotation very rapidly reaches the disengagement force and the radial vector of the force transmitted from the end face 86A to the upstanding element 76 of shaft engagement means 60A exceeds the spring force of the biasing element 74. At that time the upstanding element 76 is pushed into the cavity 68. At the same time, the shaft engagement means 60B is close to position 98 and the upstanding element 76 in its second positon within its cavity 68 and shaft 22 can then continue to rotate in a clockwise direction as shown in FIG. 7D.

When the shaft 22 rotates in an anti-clockwise direction, the same series of events takes place with the exception that the upstanding element 74 of shaft engagement means 60B abuts end face 86B rather than shaft engagement means 60A abutting end face 86A.

Figure 8:
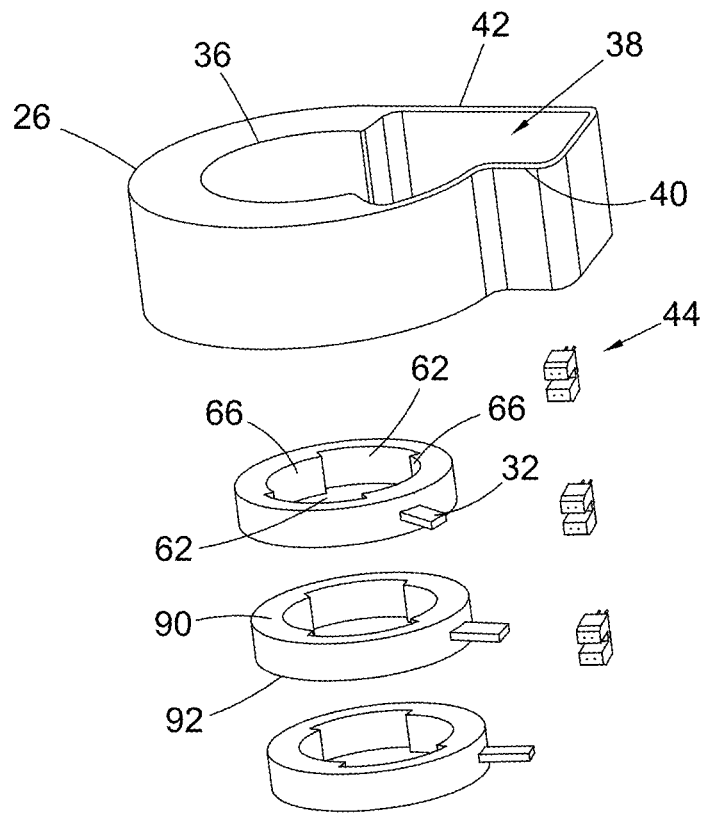
FIG. 8 shows what would have been an exploded view of FIG. 2 if the detection means were optical sensors.
Figure 8:
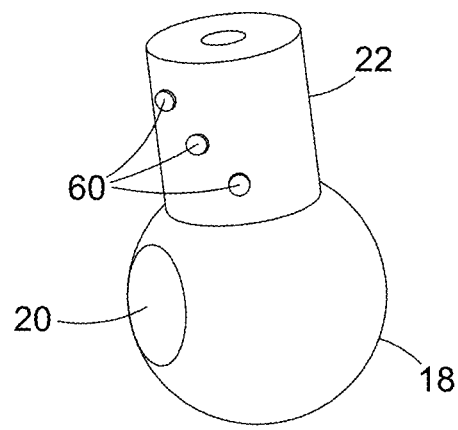

With reference to FIG. 8, this Figure shows a similar part of a valve 2 as is shown in FIG. 3 with the difference that the detector means 44 is an optical sensor. The optical sensor is switched from an open state (where no output signal is generated by the sensor) to a closed state (where an output signal is generated by the sensor) when the indicator element 32 moves into a position between a light emitter and a light detector of the sensor. The configuration of the valve 2 of FIG. 8 is schematically shown when the optical sensor is in its open state and its closed state in FIGS. 9 and 10 respectively. When the indicator element 32 is in the position in the optical sensor 44 shown in FIG. 10 it is in the first indicator position 55.

Figure 9:
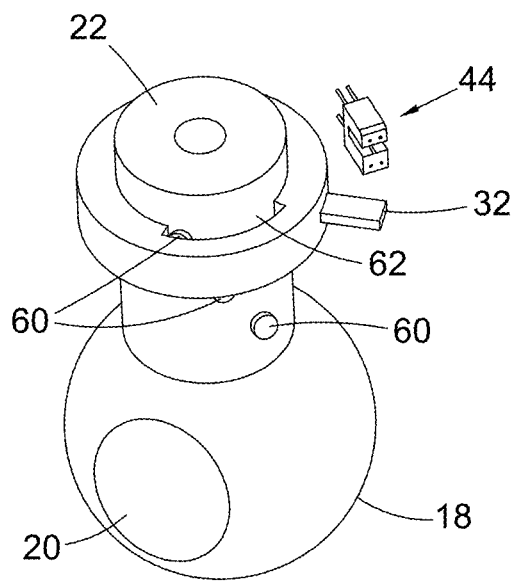
FIG. 9 shows a first view of a part of the rotational valve of FIG. 1 with optical sensors as the detection means.
Figure 10:
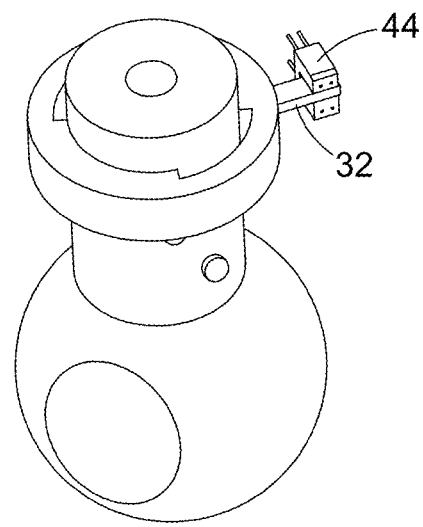
FIG. 10 shows a second view of a part of the rotational valve of FIG. 1 with optical sensors as the detection means.

In all other senses, the embodiment of the valve 2 shown in FIGS. 8 to 10 functions as the embodiment of the valve shown in FIGS. 2 to 7D.

Figure 11:
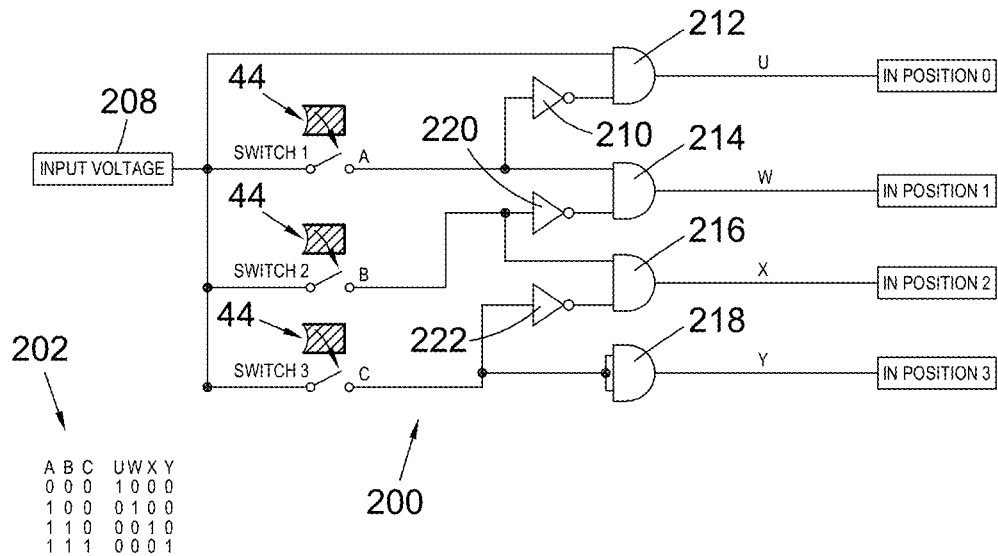
FIG. 11 shows an example logic circuit for determining the position of a closure element in an embodiment of a shut off valve according to the present invention.

With reference to FIG. 11, the Figure shows a logic circuit 200 for use in determining the position of the closure element 18 of the valve 2 when the detection means 44 are switches, and where the valve has three detection elements 44. FIG. 11 also includes a truth table 202 for the logic circuit.

The valve is so configured that switch 1 is closed when the closure element 18 is in position 0 for example fully open, and switches 1, 2, and 3 are closed when the closure element 18 is in position 3 for example fully closed.

When the closure element 18 is in position 0, a high input (current) is received in the AND gate 212 from the input voltage source 208. The NOT gate 210 has a low input because the switch 1 is open. As a result, the NOT gate 210 outputs a high output which is input into the AND gate 212. The AND Gate 212, receiving two high inputs, generates a high output and allows current to flow in wire U and an indicator means shows or reports that the that closure element 18 is in position 0.

When the closure element 18 is in position 1 switch 1 is closed and switches 2 and 3 are open. As a result, the NOT gate 210 receives a high input and thus generates a low output. The low output is input into the AND gate 212 and the indicator means which shows or reports that the that closure element 18 is in position 0 is not activated. A high input (current) passes from switch 1 to the AND gate 214. A high input to the AND gate 214 is generated by the NOT gate 220 because switch 2 is open meaning the NOT gate 220 has a low input (no current) and thus generates a high output which is an input to the AND Gate 214. The AND gate 214 accordingly generates a high output and allows current to flow in wire W and an indicator means shows or reports that the that closure element 18 is in position 1.

When the closure element 18 is in position 2 switches 1 and 2 are closed and switch 3 is open. As a result, a high input passes from switch 1 to the AND gate 214. The NOT gate 220 generates a low output and hence low input to the AND gate 214 because switch 2 is closed (meaning switch 2 generates a high output which is received by the NOT gate 220 causing a low output from the NOT gate 220 to the AND Gate 214). The AND gate 214 accordingly generates a low output and does not allow current to flow in wire W and the indicator means that shows or reports that the that closure element 18 is in position 1 is not activated. The high output from switch 2 is also the input for the AND gate 216. A high output is also generated by the NOT gate 222 and input to the AND gate 216 because switch 3 is open meaning there is a low input to the NOT gate 222 and thus a high output is generated by the NOT gate 222. That high output is input to the AND Gate 216. The AND gate 216 accordingly generates a high output which allows current to flow in wire X and an indicator means shows or reports that the that closure element 18 is in position 2.

When the closure element 18 is in position 3 switches 1, 2 and 3 are closed. As a result, a high input passes from switch 1 to the AND gate 214. The NOT gate 220 generates a low output and hence low input to the AND gate 214 because switch 2 is closed (meaning switch 2 generates a high output which is received by the NOT gate 220 causing a low output from the NOT gate 220 to the AND Gate 214). The AND gate 214 accordingly generates a low output and does not allow current to flow in wire W and the indicator means that shows or reports that the that closure element 18 is in position 1 is not activated. The high output from switch 2 is also the input for the AND gate 216. A high output is also generated by the NOT gate 222 and input to the AND gate 216 because switch 3 is open meaning there is a low input to the NOT gate 222 and thus a high output is generated by the NOT gate 222. That high output is input to the AND Gate 216. The AND gate 216 accordingly generates a high output which allows current to flow in wire X and the indicator means which shows or reports that the that ball shaft 204 is in position 2 is not activated. Switch 3 generates a high output which is the input to both inputs of the AND gate 218 and as a result the AND gate 218 generates a high output and allows current to flow in wire Y and an indicator means shows or reports that the that closure element 18 is in position 3.

Figure 12:
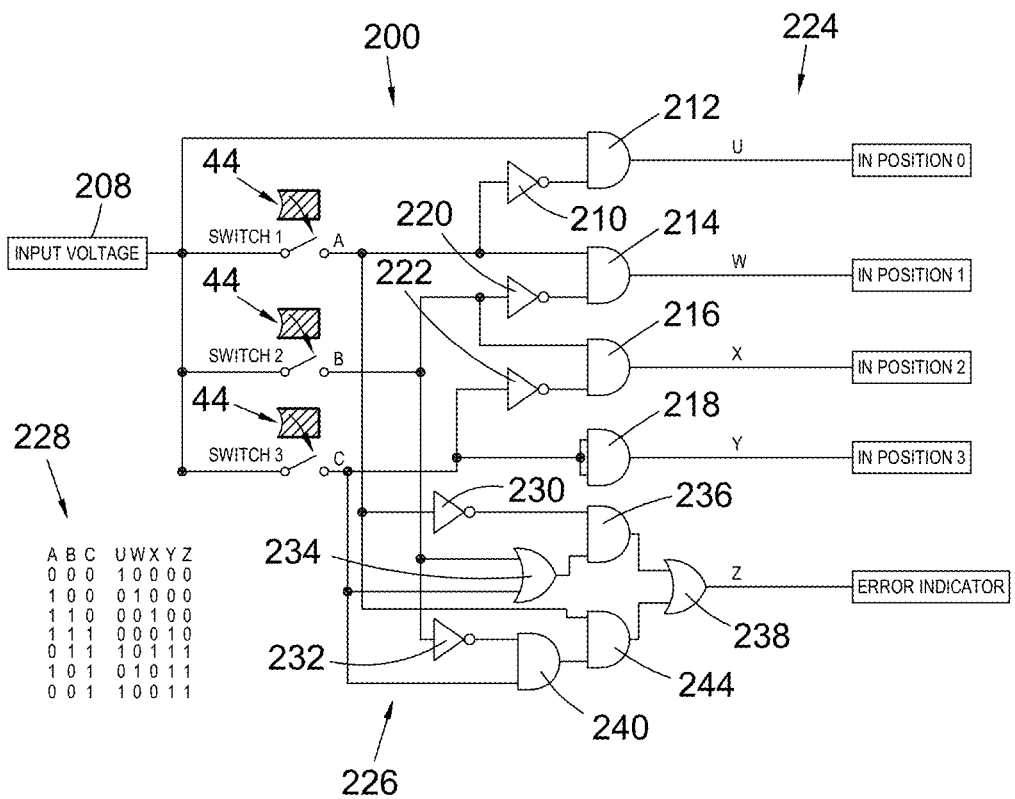
FIG. 12 shows an example logic circuit for determining the position of a closure element including an error sensing function in an embodiment of a shut off valve according to the present invention.

With reference to FIG. 12, the Figure shows a logic circuit 224 for use in determining the position of the closure element 18 of the valve 2 when the detection means 44 are switches, where the valve has three detection elements 44, and which includes a position determining circuit 200 and an error sensing circuit 226. FIG. 12 also includes a truth table 228 for the logic circuit.

The position determining circuit 200 functions as described in connection with FIG. 11.

In the error sensing circuit 226, when the closure element 18 is in position 2 the output from switches 1 and 2 should both be high and the output from switch 3 should be low. If that is the situation then the high input from switch 1 to the NOT gate 230 will cause a low output from the NOT gate 230 into the AND gate 236. The high input from switch 2 will input into the AND gate 236 via the OR gate 234, and the AND gate 236 will generate a low output. If, however, the switch 1 is not generating a high output then the NOT gate 230 will generate a high output which will input into the AND gate 236 resulting in a high output which will, via the OR gate 238 cause current to flow in wire Z and activate the error indicator.

In a similar fashion, when the closure element 18 is in position 3 all of switches 1,2, and 3 should have a high output. If switch 1 does not then as discussed above the error indicator is activated. Additionally or alternatively, if switch 2 is not generating a high output and switches 1 and 3 are generating high outputs, the NOT gate 232 will generate a high output which inputs into the AND gate 244. The other input to the AND gate 244 is the switch 1 and as a result the AND gate 244 will generate a high output output which will, via the OR gate 238 cause current to flow in wire Z and activate the error indicator.

Figure 13:
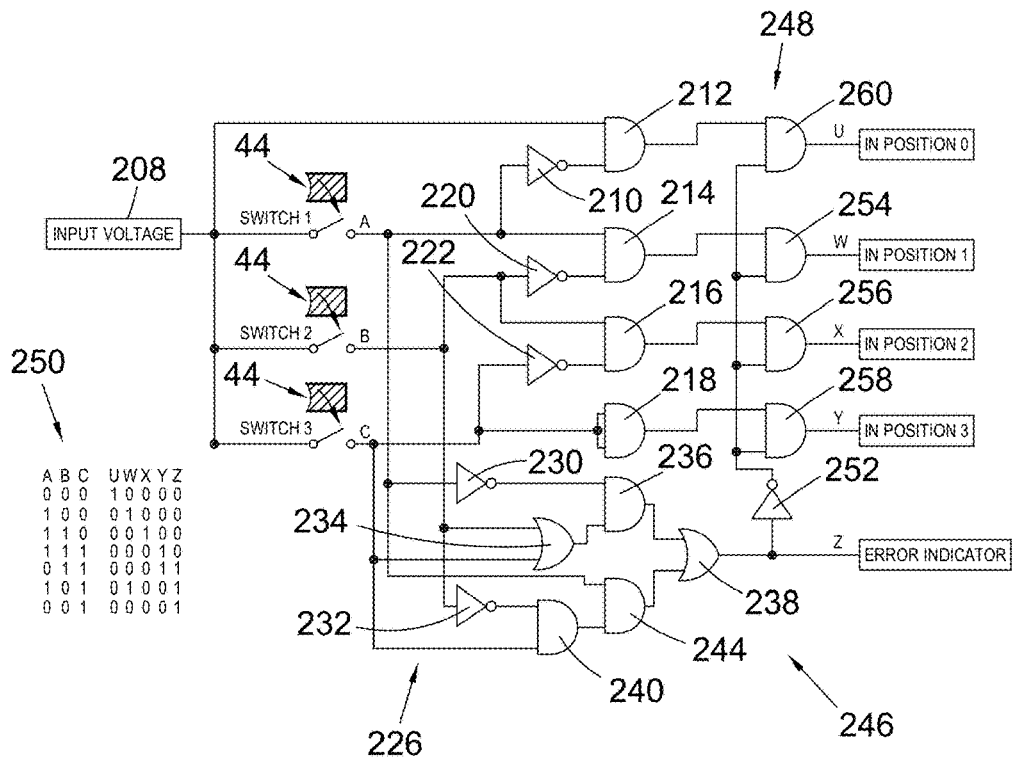
FIG. 13 shows an example logic circuit for determining the position of a closure element including an error sensing function and a false signal blocker in an embodiment of a shut off valve according to the present invention.

With reference to FIG. 13, the Figure shows a logic circuit 246 for use in determining the position of the closure element 18 of the valve 2 when the detection means 44 are switches, where the valve has three detection elements 44, and which includes a position determining circuit 200, an error sensing circuit 226, and a false signal blocker circuit 248. FIG. 13 also includes a truth table 250 for the logic circuit.

The position determining circuit 200 functions as described in connection with FIG. 11 and the error sensing circuit 226 functions as described in connection with FIG. 12.

The false signal blocker circuit 248 has the effect that as long as the error sensing circuit 226 is not sensing an error, the input to the NOT gate 252 is a low input resulting in a high output. That high output is an input to each of AND gates 260, 254, 256 and 258 which respectively have a second input from input voltage source 208, and AND gates 214, 216 and 218. As a result, the AND gates 260, 254, 256 and 258 will output a high output when the position determining circuit is determining the position of the closure element 18, and the error sensing circuit 226 is not sensing errors. If the error sensing circuit 226 senses an error, then the input to the NOT gate 252 is high and thus the input into AND gates 260, 254, 256 and 258 from the NOT gate 238 is low and no positions will be indicated for the closure element 18. The reader of the position indicators can then not be potentially mislead as to the position of the closure element 18.

Figure 14:
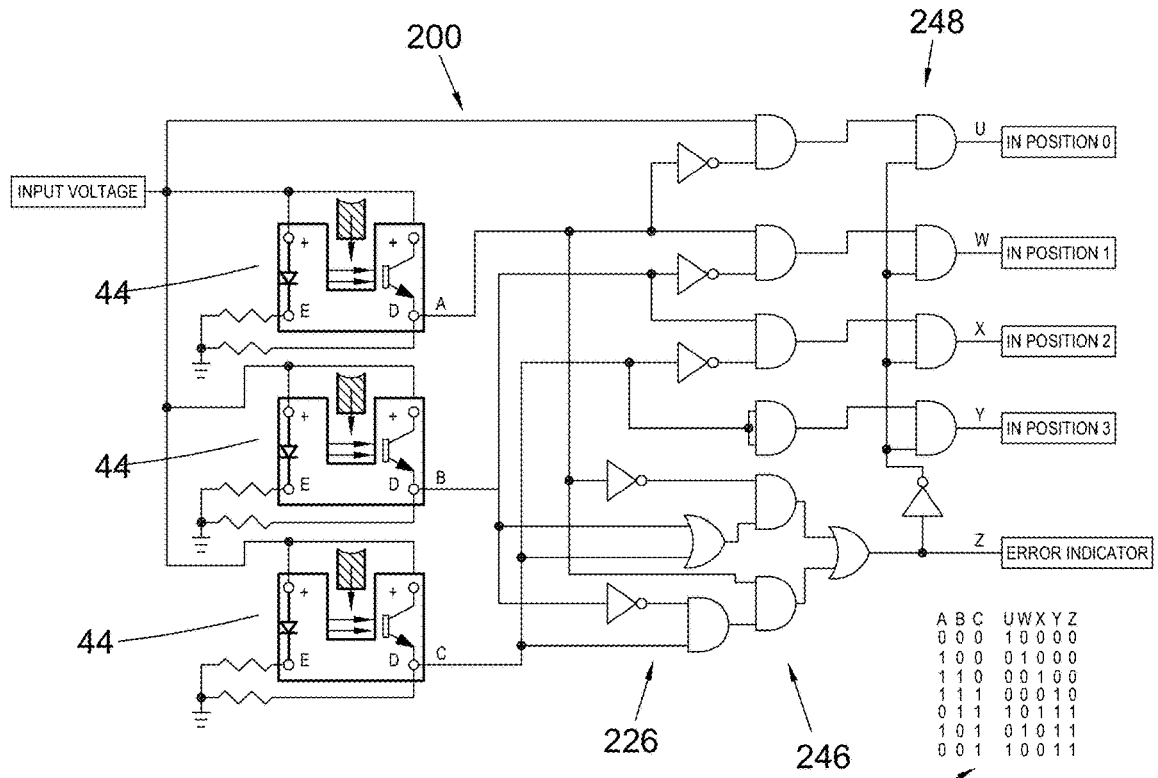
FIG. 14 shows a second logic circuit diagram for determining the position of a closure element including an error sensing function and a false signal blocker in an embodiment of a shut off valve according to the present invention.

With regard to FIG. 14, the Figure shows the same circuit as shown in FIG. 13 with the difference that the input devices 44 are optical sensors. The circuit 246 functions in the same way as described in connection with FIG. 13.

FIGS. 16 to 19 show logic circuits for a valve as described herein when the rotational valve is a configurable channel flow valve as schematically shown in FIGS. 15A to 15C. FIGS. 15A to 15C show three orientations of a ball shaft 104 within a valve body 8. The ball shaft 104 includes a T-shaped channel 106, and the valve body 8 includes an inlet port 112, and first and second outlet ports 108, 110.

The ball shaft 104 can be rotated between position where the channel allows fluid communication from the inlet 112 to both of the outlets 108, 110 (where the ball shaft 104 has a rotational position of about 88-92 degrees) as shown in FIG. 15A; the position where the channel allows fluid communication from the inlet 112 to the outlet 110 but not outlet 108 (where the ball shaft 104 has a rotational position of about 178-182 degrees) as shown in FIG. 15B; the position where the channel allows fluid communication from the inlet 112 to the outlet 108 but not to outlet 110 (where the ball shaft 104 has a rotational position of about 268-272 degrees) as shown in FIG. 15C; and the position (not shown) in which the inlet 112 is closed (where the ball shaft 104 has a rotational position of less than about 88 degrees or greater than about 272 degrees.

Figure 16:
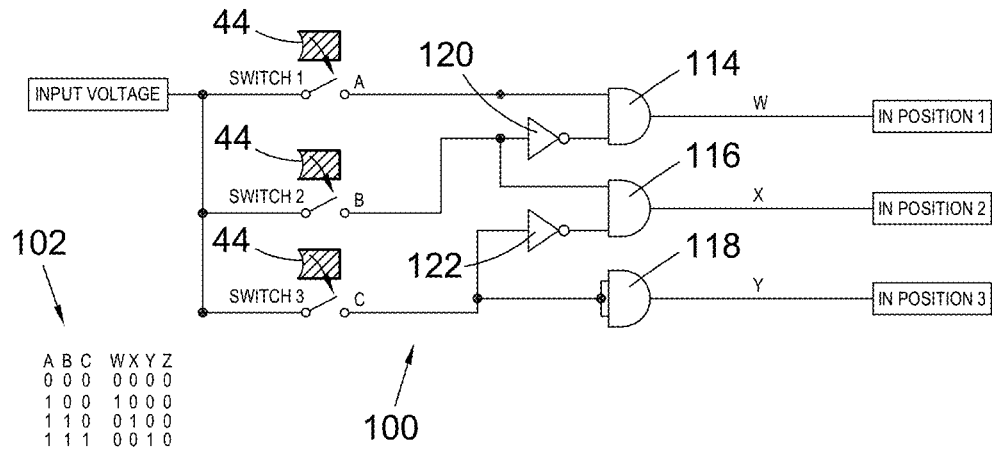
FIG. 16 shows an example logic circuit for determining the position of a closure element in an embodiment of a configurable channel flow valve according to the present invention.

With reference to FIG. 16, the Figure shows a logic circuit 100 for use in determining the position of the ball shaft 104 of the valve of FIGS. 15A to 15C when the detection means 44 are switches, and where the valve has three detection elements 44 in the form of switches. FIG. 16 also includes a truth table 102 for the logic circuit.

The valve is so configured that switch 1 is closed when the ball shaft 104 is in position 1' for example the position shown in FIG. 15A, switches 1 and 2 are closed when the ball shaft 104 is in position 2' for example the position shown in FIG. 15B, and switches 1, 2, and 3 are closed when the ball shaft 104 is in position 3' for example the position shown in FIG. 15C.

When the ball shaft 104 is in position 1' switch 1 is closed and switches 2 and 3 are open. As a result, a high input (current) passes from switch 1 to the AND gate 114. A high input to the AND gate 114 is generated by the NOT gate 120 because switch 2 is open meaning the NOT gate 120 has a low input (no current) and it thus generates a high output which is an input to the AND Gate 114. The AND gate 114 accordingly generates a high output and allows current to flow in wire W and an indicator means shows or reports that the that ball shaft 104 is in position 1'.

When the ball shaft 104 is in position 2' switches 1 and 2 are closed and switch 3 is open. As a result, a high input passes from switch 1 to the AND gate 114. The NOT gate 120 generates a low output and hence low input to the AND gate 114 because switch 2 is closed (meaning switch 2 generates a high output which is received by the NOT gate 120 causing a low output from the NOT gate 120 to the AND Gate 114). The AND gate 114 accordingly generates a low output and does not allow current to flow in wire W and the indicator means that shows or reports that the that ball shaft 104 is in position 1' is not activated. The high output from switch 2 is also the input for the AND gate 116. A high output is also generated by the NOT gate 122 and input to the AND gate 116 because switch 3 is open meaning there is a low input to the NOT gate 122 and thus a high output is generated by the NOT gate 122. That high output is input to the AND Gate 116. The AND gate 116 accordingly generates a high output which allows current to flow in wire X and an indicator means shows or reports that the that ball shaft 104 is in position 2'.

When the ball shaft 104 is in position 3' switches 1, 2 and 3 are closed. As a result, a high input passes from switch 1 to the AND gate 114. The NOT gate 120 generates a low output and hence low input to the AND gate 114 because switch 2 is closed (meaning switch 2 generates a high output which is received by the NOT gate 120 causing a low output from the NOT gate 120 to the AND Gate 114). The AND gate 114 accordingly generates a low output and does not allow current to flow in wire W and the indicator means that shows or reports that the that ball shaft 104 is in position 1' is not activated. The high output from switch 2 is also the input for the AND gate 116. A high output is also generated by the NOT gate 122 and input to the AND gate 116 because switch 3 is open meaning there is a low input to the NOT gate 122 and thus a high output is generated by the NOT gate 122. That high output is input to the AND Gate 116. The AND gate 116 accordingly generates a high output which allows current to flow in wire X and the indicator means which shows or reports that the that ball shaft 104 is in position 2' is not activated. Switch 3 generates a high output which is the input to both inputs of the AND gate 118 and as a result the AND gate 118 generates a high output and allows current to flow in wire Y and an indicator means shows or reports that the that ball shaft 104 is in position 3'.

Figure 17:
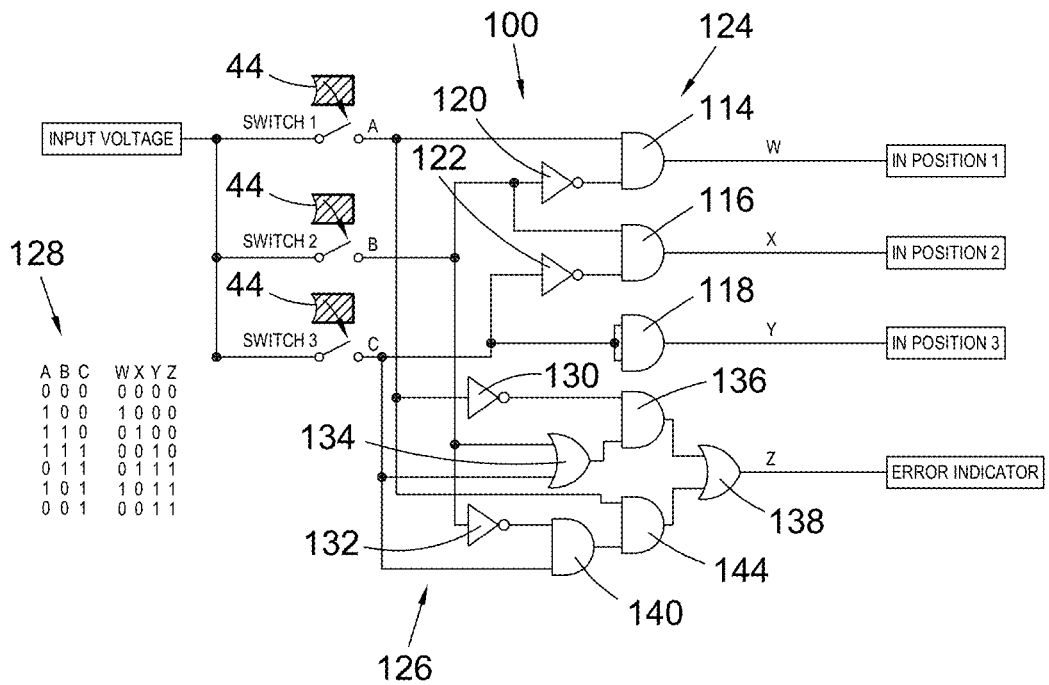
FIG. 17 shows an example logic circuit for determining the position of a closure element including an error sensing function in an embodiment of a configurable channel flow valve according to the present invention.

With reference to FIG. 17, the Figure shows a logic circuit 124 for use in determining the position of the ball shaft 104 of the valve of FIGS. 15A to 15C when the detection means 44 are switches, where the valve has three detection elements 44, and which includes a position determining circuit 100 and an error sensing circuit 126. FIG. 17 also includes a truth table 128 for the logic circuit.

The position determining circuit 100 functions as described in connection with FIG. 16.

In the error sensing circuit 126, when the ball shaft 104 is in position 2' the output from switches 1 and 2 should both be high and the output from switch 3 should be low. If that is the situation then the high input from switch 1 to the NOT gate 130 will cause a low output from the NOT gate 130 into the AND gate 136. The high input from switch 2 will input into the AND gate 136 via the OR gate 134, and the AND gate 136 will generate a low output. If, however, the switch 1 is not generating a high output then the NOT gate 130 will generate a high output which will input into the AND gate 136 resulting in a high output which will, via the OR gate 138 cause current to flow in wire Z and activate the error indicator.

In a similar fashion, when the ball shaft 104 is in position 3' all of switches 1,2, and 3 should have a high output. If switch 1 does not then as discussed above the error indicator is activated. Additionally or alternatively, if switch 2 is not generating a high output and switches 1 and 3 are generating high outputs, the NOT gate 132 will generate a high output which inputs into the AND gate 144. The other input to the AND gate 144 is the switch 1 and as a result the AND gate 144 will generate a high output which will, via the OR gate 138 cause current to flow in wire Z and activate the error indicator.

Figure 18:
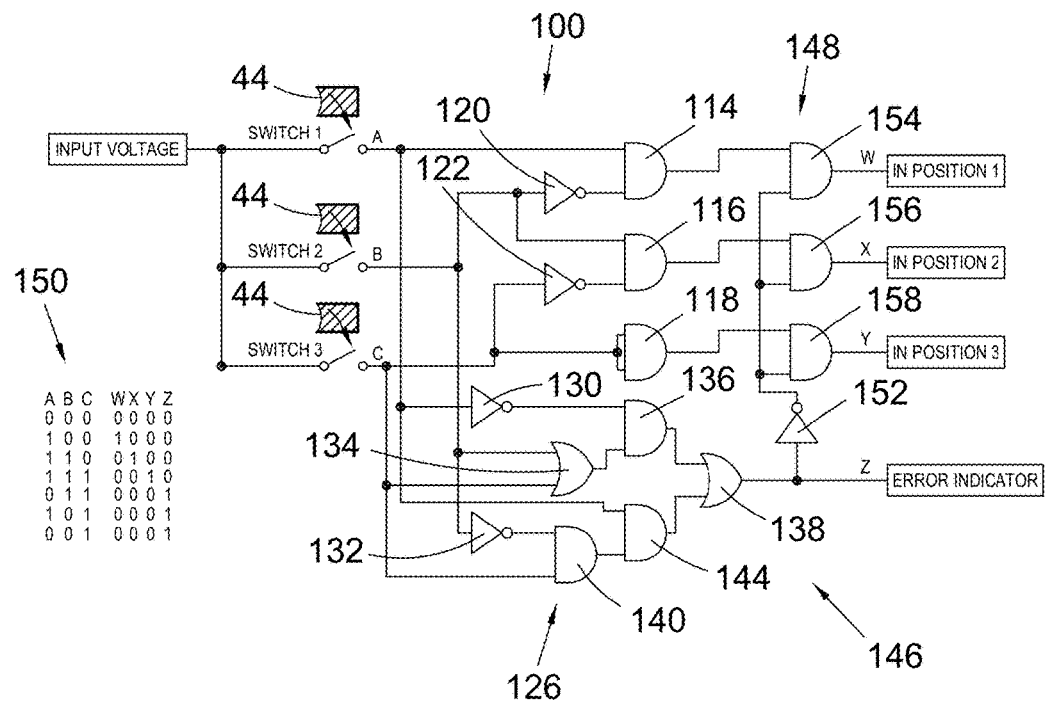
FIG. 18 shows an example logic circuit for determining the position of a closure element including an error sensing function and a false signal blocker in an embodiment of a configurable channel flow valve according to the present invention.

With reference to FIG. 18, the Figure shows a logic circuit 146 for use in determining the position of the ball shaft 104 of the valve of FIGS. 15A to 15C when the detection means 44 are switches, where the valve has three detection elements 44, and which includes a position determining circuit 100, an error sensing circuit 126, and a false signal blocker circuit 148. FIG. 18 also includes a truth table 150 for the logic circuit.

The position determining circuit 100 functions as described in connection with FIG. 16 and the error sensing circuit 126 functions as described in connection with FIG. 17.

The false signal blocker circuit 148 has the effect that as long as the error sensing circuit 126 is not sensing an error, the input to the NOT gate 152 is a low input resulting in a high output. That high output is an input to each of AND gates 154, 156 and 158 which respectively have a second input from AND gates 114, 116 and 118. As a result, the AND gates 154, 156 and 158 will output a high output when the position determining circuit is determining the position of the ball shaft 104, and the error sensing circuit 126 is not sensing errors. If the error sensing circuit 126 senses an error, then the input to the NOT gate 152 is high and thus the input into AND gates 154, 156 and 158 from the NOT gate 138 is low and no positions will be indicated for the ball shaft 104. The reader of the position indicators can then not be potentially mislead as to the position of the ball shaft 104.

Figure 19:
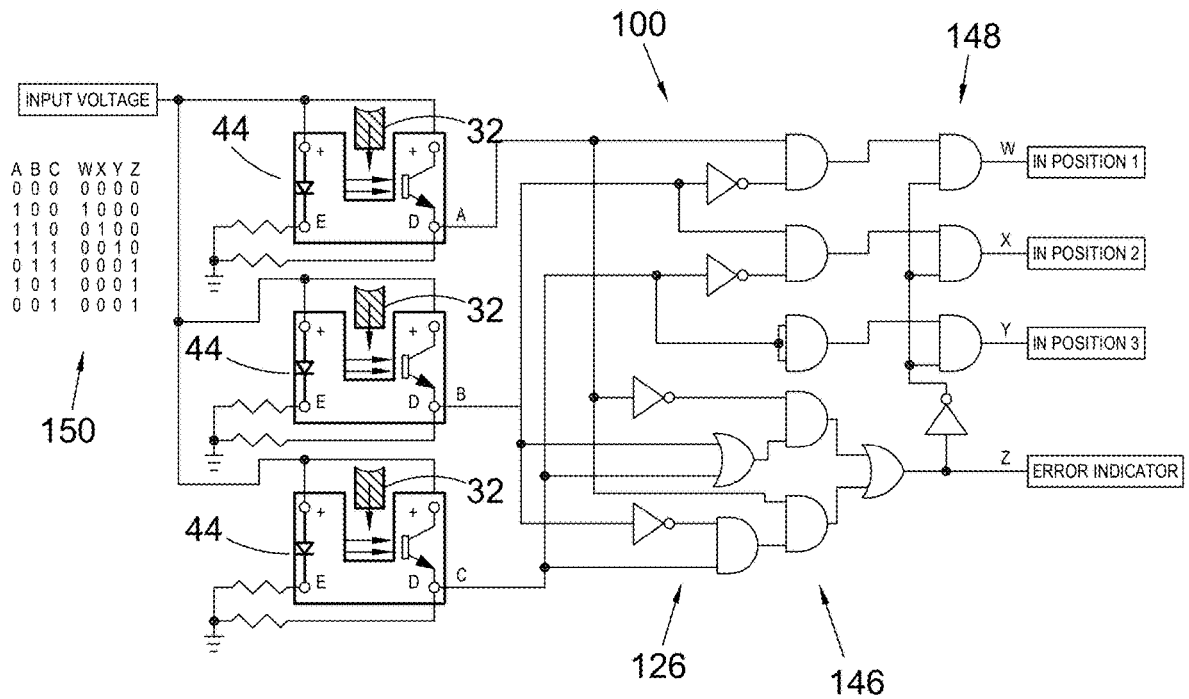
FIG. 19 shows a second logic circuit diagram for determining the position of a closure element including an error sensing function and a false signal blocker in an embodiment of a configurable channel flow valve according to the present invention.

With regard to FIG. 19, the Figure shows the same circuit as shown in FIG. 18 with the difference that the input devices 44 are optical sensors. The circuit 146 functions in the same way as described in connection with FIG. 18.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the valves disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A rotational valve comprising:
 a valve closure element;
 a shaft linked to the valve closure element, wherein the shaft can rotate between a closed position and a fully open position;
 at least one detection element, each detection element comprises an aperture and an indicator element; and
 at least one first stop and at least one second stop;
 wherein;
 the shaft extends through the aperture of at least one detection element, wherein each of the at least one detection elements is in sliding engagement with the shaft;
 the shaft can rotate relative to each of the at least one detection elements;
 each indicator element can move between a first and a second indicator position;
 each indicator element abuts the first stop when in the first indicator position and abuts the second stop when in the second indicator position;
 each indicator element is associated with a detection engagement means;
 each detection engagement means can determine when its associated indicator element is in one of the first or second indicator positions; and
 each detection element is configured to engage with the shaft via at least one engagement mechanism when the rotational position of the shaft relative to the shaft's closed position is in a predetermined angular range;

wherein each engagement mechanism comprises:
a shaft engagement means associated with the shaft; and
a detection engagement means associated with a detection element;
wherein engagement of the shaft and detection engagement means enables the shaft to transmit rotational torque to the detection element via the shaft and detection engagement means; and
wherein the shaft and detection engagement means are configured such that if rotation of the detection element is resisted by a force greater in magnitude than a disengagement force the shaft and detection engagement means will disengage from each other.

2. The rotational valve according to claim 1, wherein the valve (2) comprises:
at least two detection elements;
wherein each of the detection elements engages with the shaft when the rotational position of the shaft relative to the shaft's closed position is in a predetermined angular range and that angular range is different for each detection element.

3. The rotational valve according to claim 2, wherein:
at least one of the shaft and detection engagement means is associated with a first and a second engagement mechanism;
the shaft and detection engagement means of the first engagement mechanism are dimensioned and configured so that they engage with each other when the shaft is rotating in a first direction and do not engage with each other when the shaft is rotating in the opposite second direction; and
the shaft and detection engagement means of the second engagement mechanism are dimensioned and configured so that they engage with each other when the shaft is rotating in the second direction and do not engage with each other when the shaft is rotating in the first direction.

4. The rotational valve according to claim 3, wherein in at least one engagement mechanism the shaft engagement means is a male engagement means and the detection engagement means is a female engagement means, or the shaft engagement means is a female engagement means and the detection engagement means is a male engagement means.

5. The rotational valve according to claim 4, wherein the male engaging means comprises:
a cavity;
a biasing element; and
an upstanding element;
wherein:
the cavity is defined by a cavity base and one or more walls;
the cavity, the biasing element and the upstanding element are dimensioned and configured that the cavity may contain the biasing element and the upstanding element;
the biasing element biases the upstanding element at least partially out of the cavity;
the upstanding element may reversibly move between a first position in which it is at least substantially wholly within the cavity, and a second position in which at least a portion of the upstanding element extends out of the cavity; and
the one or more walls of the cavity can engage with the upstanding element to resist forces exerted on the upstanding element in a direction perpendicular to the direction of movement of the upstanding element between the first and second positions.

6. The rotational valve according to claim 5, in which at least one female engaging means comprises a circumferentially extending slot, in which the axial width and radial depth of the slot are sufficient to allow at least a portion of the male engagement means to enter the slot and move along the circumferential length of the slot.

7. The rotational valve according to claim 6, wherein the male engagement means and at least one end of the circumferentially extending slot are so configured that when the male engagement means abuts the at least one end of the circumferentially extending slot and rotation of the detection element is resisted by a force less than the disengagement force, torque from the shaft is transmitted to the detection element through the abutment of the male engagement means and the at least one end of the circumferentially extending slot.

8. The rotational valve according to claim 7, wherein one end of the circumferentially extending slot is so configured that travel of the male engagement member along the slot toward that end and subsequently out of the slot does not transmit any torque from the shaft to the detection element when the rotation of the detection element is resisted by a force less than the disengagement force.

9. The rotational valve according to claim 1, wherein the one or more detection engagement means comprises a mechanical switch, an optical sensor, a hall effect sensor, or an ultrasonic sensor.

10. The rotational valve according to claim 1, further comprising:
an actuation means, wherein actuation of the actuation means rotates the shaft and causes rotation of the closure element or actuation of the actuation means rotates the closure element and causes rotation of the shaft.

11. The rotational valve according to claim 10, wherein the actuation means comprises an electrically powered motor.

12. The rotational valve according to claim 1, further comprising:
an enclosure, wherein the enclosure at least partially surrounds the shaft, detection elements, indicator elements and detection engagement means.

13. A potable water system for an aircraft comprising:
at least one rotational valve according to claim 1.

14. A method for determining the position of a valve closure element within a rotational valve comprising:
use of a valve according to claim 1; and
with an interpretation means, converting signals received from the detection means to a signal signifying the position of the valve closure element.

* * * * *